(No Model.)

M. R. BRINKMAN.
FOOT SHIELD FOR PIANO AND ORGAN CASES.

No. 396,137. Patented Jan. 15, 1889.

WITNESSES:
J. C. Garfield
C. Sedgwick

INVENTOR:
M. R. Brinkman
BY Munn & Co.
ATTORNEYS.

UNITED STATES PATENT OFFICE.

MAX R. BRINKMAN, OF NEW HAVEN, CONNECTICUT.

FOOT-SHIELD FOR PIANO AND ORGAN CASES.

SPECIFICATION forming part of Letters Patent No. 396,137, dated January 15, 1889.

Application filed October 31, 1888. Serial No. 289,654. (No model.)

*To all whom it may concern:*

Be it known that I, MAX RUDOLPH BRINKMAN, of New Haven, in the county of New Haven and State of Connecticut, have invented a new and Improved Foot-Shield for Pianos, Organs, and Similar Instruments, of which the following is a full, clear, and exact description.

My invention relates to an improvement in foot-shields for pianos, organs, and similar instruments, and has for its object to provide a shield which may be attached to the instrument without materially defacing the same should the device for any purpose be removed; and a further object of the invention is to provide an attachment which will not only preserve the instrument from injury when the operator is seated in front of the same, but which will also protect the instrument when the operator turns in the seat to face the instrument or leave it, or when the feet are removed from the pedals for any cause while the operator is seated.

The invention consists in the novel construction and combination of the several parts, as will be hereinafter fully described, and pointed out in the claims.

Reference is to be had to the accompanying drawings, forming a part of this specification, in which similar figures of reference indicate corresponding parts in all the views.

Figure 1:
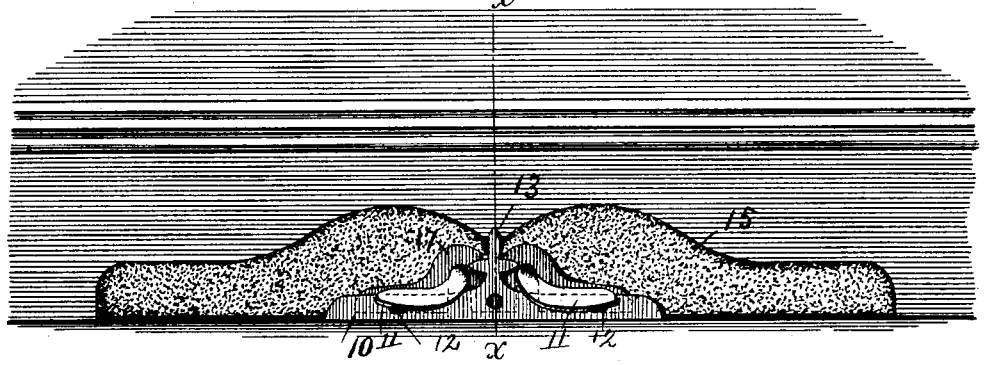
Figure 2:
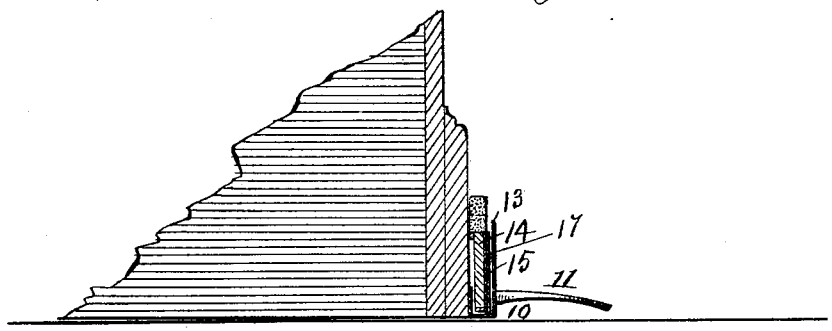
Figure 3:
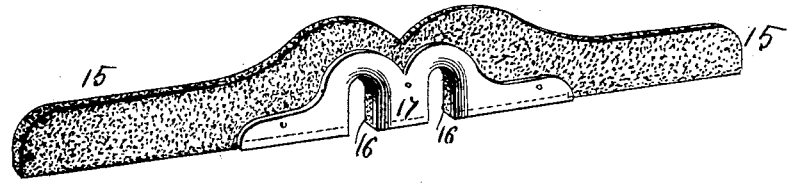
Figure 4:
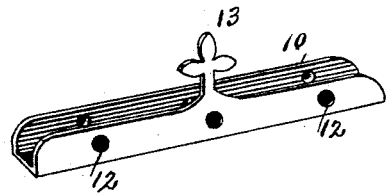

Figure 1 is a front elevation of the device illustrated as attached to an instrument. Fig. 2 is a transverse section taken on line $x$ $x$ in Fig. 1. Fig. 3 is a perspective view of the shield detached from the instrument; and Fig. 4 is a perspective view of the shoe detached, which shoe is adapted to receive the shield.

The prime object of this invention is to provide a shield which may be fitted upon the instrument over the pedals to protect the casing at that point, and also to so construct the shield that the instrument will be protected when the operator turns upon the seat.

The secondary object of the invention is to provide a shield which, when worn, may be readily detached, re-covered, and replaced.

In carrying out the invention a shoe, 10, essentially U-shaped in cross-section, is screwed or otherwise attached to the bottom of the front casing of the instrument immediately below the pedals 11. The outer wall of the shoe 10 is provided with two or more (preferably three) apertures, 12, one being located at the center and one at each end, as best illustrated in Fig. 4, and the said outer wall of the shoe 10 at the center is preferably provided with an ornament, 13, adapted to project upward between the pedals, as illustrated in Fig. 1.

The shield consists of a body, 14, of wood or other equivalent material, which body is provided with a padding, 15, upon its outer face, said padding being adapted to extend over the top and bottom, in order to protect that portion of the instrument against which the inner face of the shield may bear, as best illustrated in Fig. 2. The padding 15 may consist of a covering of silk, plush, or other equivalent material, and a wadding or hair filling may be made to intervene the outer covering and the contiguous face of the body, if desired. At each side of the center the shield is provided with a vertical recess, 16, produced in the bottom edge, through which the pedals project when the shield is in position, and a metal plate or stay, 17, is rigidly secured to the outer face of the shield at the center, provided with pedal-recesses registering with and corresponding to the recesses 16 in the shield. The metal stay or plate is of less height than the shield proper, and the top of the said plate or stay is preferably made to correspond with the upper contour of the shield-body.

The shield-body is made to project a sufficient distance beyond the ends of the plate or stay 17 to effectually protect the casing from being marred by the feet of the operator when turning to or from the face of the instrument, as is best illustrated in Fig. 1.

In attaching the shield to the instrument the said shield is inserted in the shoe to a bearing upon the bottom of the same in such a manner that the pedals which project beyond the top of the shoe will also extend outward from the recesses 16 in said shield and attached plate. When the shield is thus placed in position, it may be rigidly secured by screws or equivalent fastening devices passed through the apertures 12 of the shoe into similar threaded apertures in the plate or stay. It is not necessary, however, that the shield be rigidly attached, as the weight of the said shield will ordinarily keep it in position, and to that end the bottom edge of the shield is preferably provided with a central recess of slightly greater length than the length of the shoe, so that when no retaining-screws are employed the recess receiving the shoe will prevent the shield from having lateral movement. The recess is illustrated in dotted lines, Fig. 3.

The surface of the shield contiguous to the pedal-openings, as also illustrated in Fig. 3, is preferably beveled, and the plate is correspondingly beveled to admit of the use of short pedals, and also to accommodate the toes of the operator.

Having thus described my invention, I claim as new and desire to secure by Letters Patent—

1. The combination, with a shoe essentially U-shaped in cross-section, of a shield adapted to enter the said shoe, consisting of a padded body portion containing a pedal-recess in the bottom at each side of the center and a metal plate or stay, correspondingly recessed, attached to the body at the center thereof, substantially as shown and described, whereby the padded portion of the shield will extend a distance beyond each end of the stay, as and for the purpose specified.

2. The combination, with the casing of a piano, organ, or similar instrument, and a shoe essentially U-shaped in cross-section attached to the bottom of the said casing at the center of the front, of a shield consisting of a body portion provided with a padded outer face and pedal-recesses in the lower edge, one at each side of the center, and a metal plate or stay correspondingly recessed secured to the outer face of the said body, substantially as and for the purpose specified.

3. The combination, with the front casing of a piano, organ, or similar instrument, and a shoe essentially U-shaped in cross-section, provided with apertures in its outer wall, attached at the center and bottom of the said casing, of a shield adapted to enter the said shoe, consisting of a body portion of wood or equivalent material having a padded outer face, which padding extends over the top and bottom, partially covering the back, and having pedal-recesses produced in the lower edge, one at each side of the center, a metal plate or stay of less length than the shield-body, correspondingly recessed and attached to the outer face of the said body, and screws or equivalent fastening devices passed through the apertures in the shoe into the said plate or stay, all combined for operation substantially as shown and described.

MAX R. BRINKMAN.

Witnesses:
ROBT. A. BRONSON,
FREDERICK W. BROWN.